United States Patent
Lin et al.

(10) Patent No.: US 12,550,227 B2
(45) Date of Patent: Feb. 10, 2026

(54) TIMER OPERATING METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Xue Lin, Guangdong (CN); Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 274 days.

(21) Appl. No.: 18/454,049

(22) Filed: Aug. 22, 2023

(65) Prior Publication Data
US 2023/0397298 A1    Dec. 7, 2023

Related U.S. Application Data (63) Continuation of application No. PCT/CN2021/078588, filed on Mar. 2, 2021.

(51) Int. Cl.
*H04W 76/38* (2018.01)
*H04W 72/0446* (2023.01)
(Continued)

(52) U.S. Cl.
CPC ....... *H04W 76/38* (2018.02); *H04W 72/0446* (2013.01); *H04W 72/23* (2023.01); *H04W 76/27* (2018.02)

(58) Field of Classification Search
CPC ..... H04W 76/38; H04W 76/27; H04W 72/23; H04W 72/0446
See application file for complete search history.

(56) References Cited

U.S. PATENT DOCUMENTS

2020/0107283 A1    4/2020    Ratasuk et al.
2024/0057003 A1*   2/2024    Chen ............... H04W 72/231
(Continued)

FOREIGN PATENT DOCUMENTS

CN    108337728    7/2018
CN    111247845    6/2020
(Continued)

OTHER PUBLICATIONS

Lenovo, R2-2100930, 'Further details of CG aspects', 3GPP RAN WG2 Meeting #113e, Jan. 25-Feb. 5, 2021, pp. 1-31. (Year: 2021).*
(Continued)

*Primary Examiner* — Melvin C Marcelo
(74) *Attorney, Agent, or Firm* — Hodgson Russ LLP (57) ABSTRACT

Embodiments of the present application relate to a timer operating method, a terminal device, and a network device. The method comprises: a terminal device receives a first message, the first message being directed against a pre-configured (CG) resource for inactive state data transmission; and the terminal device performs a corresponding operation on a first timer according to the first message, the first timer being used for maintaining the validity of first timing advance. According to the embodiments of the present application, the terminal device may specify a timer mechanism of data transmission and maintained timing advance.

20 Claims, 4 Drawing Sheets

200

A terminal device receives a first message, the first message being directed against a pre-configured (CG) resource for inactive state data transmission — S210

The terminal device performs a corresponding operation on a first timer according to the first message, the first timer being used for maintaining the validity of first timing advance — S220

(51) Int. Cl.
*H04W 72/23* (2023.01)
*H04W 76/27* (2018.01)

(56) References Cited

U.S. PATENT DOCUMENTS

2024/0057204 A1* 2/2024 Zhang .................. H04W 76/27
2024/0215075 A1* 6/2024 Feltrin ................. H04W 72/23

FOREIGN PATENT DOCUMENTS

WO 2020164460 8/2020
WO 2020222180 11/2020

OTHER PUBLICATIONS

Apple, "CG based SDT procedure," 3GPP TSG-RAN WG2 Meeting #113-e, R2-2101371, Jan. 2021.
Huawei et al., "Discussion on CG-based scheme," 3GPP TSG-RAN WG2 #112-e, R2-2010281, Nov. 2020.
NEC, "Discussion on CG-based Small Data Transmissions," 3GPP TSG-RAN WG2 Meeting #112 electronic, R2-2009973, Nov. 2020.
EPO, Extended European Search Report for EP Application No. 21928447.8, Feb. 15, 2024.
Interdigital, "Report for Rel-17 Small data and URLLC/IIoT and Rel-16 NR-U, Power Savings, and 2step RACH," 3GPP TSG-RAN WG2 Meeting #113 electronic, R2-2101954, Jan. 2021.
WIPO, International Search Report and Written Opinion for PCT/CN2021/078588, Nov. 22, 2021.
ETSI MCC, "Report of 3GPP TSG RAN2#112-e meeting, Online," 3GPP TSG-RAN WG2 meeting #113-e, R2-2100001, Nov. 2020.
EPO, Communication for EP Application No. 21928447.8, Jan. 3, 2025.
"5G; NR; Medium Access Control (MAC) protocol specification (3GPP TS 38.321 version 16.1.0 Release 16)," ETSI TS 138 321, Jul. 2020, v16.1.0.

* cited by examiner

S210 — A terminal device receives a first message, the first message being directed against a pre-configured (CG) resource for inactive state data transmission S220 — The terminal device performs a corresponding operation on a first timer according to the first message, the first timer being used for maintaining the validity of first timing advance

S310 — The network device sends a first message to the terminal device to trigger the terminal device to perform a corresponding operation on a first timer, where the first timer is used for maintaining a validity of a first timing advance; where the first message is for a CG resource used for inactive state data transmission

TIMER OPERATING METHOD, TERMINAL DEVICE, AND NETWORK DEVICE

CROSS-REFERENCE TO RELATED APPLICATION

This application is a continuation of International Application No. PCT/CN2021/078588, filed Mar. 2, 2021, the entire disclosure of which is incorporated herein by reference.

TECHNICAL FIELD

The present application relates to the field of communications, and more particularly, to a timer running method, a terminal device and a network device.

BACKGROUND

In the 5G New Radio (NR) system, the Radio Resource Control (RRC) states are divided into three types: RRC_IDLE (RRC idle state), RRC_INACTIVE (RRC inactive state) and RRC_CONNECTED (RRC connected state). The RRC_INACTIVE state is a new state introduced by the 5G system from the perspective of energy saving. For user equipment (UE) in the RRC_INACTIVE state, the radio bearer and all radio resources will be released, but the UE side and the base station side retain the UE access context, so as to quickly restore the RRC connection. The network usually keeps the UE with infrequent data transmission in the RRC_INACTIVE state. Before the Rel-16 standard, the UE in the RRC_INACTIVE state did not support data transmission, and when the uplink (Mobile Original, MO) or downlink (Mobile Terminal, MT) data arrives, the UE needs to restore the connection, and after the data transmission is completed, it is released to the INACTIVE state. For a UE with a small amount of data and a low transmission frequency, such a transmission mechanism may lead to unnecessary power consumption and signaling overhead. Therefore, Rel-17 established a project to carry out research on Small Data Transmission (SDT) under RRC_INACTIVE. The objectives of the project mainly have two directions: uplink small data transmission based on random access procedure (two-step/four-step) (RA-SDT) and uplink small data transmission based on a configured grant resource (such as CG type1) (CG-SDT).

At the RAN2 #112 meeting, it was agreed to configure the preconfigured resource (Configured Grant Resource, CG) for inactive state data transmission for the UE through the RRC release (RRCRelease) message, and to introduce a new time alignment timer (TAT) for the CG-SDT (referred to as SDT-TAT in the present application) for maintaining the validity of the timing advance in the CG-SDT process. In the subsequent RAN2 #113e meeting, further conclusions were drawn about SDT-TAT, and the start/restart timing of SDT-TAT and the behavior after the SDT-TAT expires were preliminarily determined. At present, there is no definite solution for the running mechanism of the timer for uplink small data transmission (SDT) and the method for maintaining the valid timing advance during running of the timer.

SUMMARY

The embodiments of the present application provide a timer running method, a terminal device, and a network device, and provide definite solutions for the running mechanism of the timer for uplink small data transmission and the method for maintaining a valid timing advance during running of the timer.

The embodiment of the present application provides a timer running method, and the method includes:
receiving, by a terminal device, a first message, where the first message is for a Configured Grant (CG) resource used for inactive state data transmission;
performing, by the terminal device, a corresponding operation on a first timer according to the first message, where the first timer is used for maintaining a validity of a first timing advance.

An embodiment of the present application provides a method for controlling running of a timer, including:
sending, by a network device, a first message to a terminal device, to trigger the terminal device to perform a corresponding operation on a first timer, where the first timer is used for maintaining a validity of a first timing advance; where the first message is for a CG resource used for inactive state data transmission.

An embodiment of the present application provides a terminal device, including:
a receiving module, configured to receive a first message, where the first message is for a Configured Grant (CG) resource used for inactive state data transmission;
a performing module, configured to perform a corresponding operation on a first timer according to the first message, where the first timer is used for maintaining a validity of a first timing advance.

An embodiment of the present application provides a network device, including:
a first sending module, configured to send a first message by the network device to a terminal device, to trigger the terminal device to perform a corresponding operation on a first timer, where the first timer is used for maintaining a validity of a first timing advance; where the first message is for a CG resource used for inactive state data transmission.

An embodiment of the present application provides a terminal device, including a processor and a memory. The memory is configured to store a computer program, and the processor is configured to call and run the computer program stored in the memory, so that the terminal device executes the above-mentioned timer running method.

An embodiment of the present application provides a network device, including a processor and a memory. The memory is configured to store a computer program, and the processor is configured to call and run the computer program stored in the memory, so that the network device executes the above-mentioned method for controlling running of a timer.

An embodiment of the present application provides a chip for implementing the above-mentioned timer running method.

Specifically, the chip includes: a processor configured to call and run a computer program from the memory, so that the device on which the chip is installed executes the above-mentioned timer running method.

An embodiment of the present application provides a chip for implementing the above method for controlling running of a timer.

Specifically, the chip includes: a processor configured to call and run a computer program from the memory, so that the device installed with the chip executes the above-mentioned method for controlling running of a timer.

An embodiment of the present application provides a computer-readable storage medium for storing a computer program, and when the computer program is run by a device, the device is caused to execute the above-mentioned timer running method.

An embodiment of the present application provides a computer-readable storage medium for storing a computer program, and when the computer program is run by a device, the device is caused to execute the above-mentioned method for controlling running of a timer.

An embodiment of the present application provides a computer program product, including computer program instructions, and the computer program instructions cause a computer to execute the above-mentioned timer running method.

An embodiment of the present application provides a computer program product, including computer program instructions, and the computer program instructions cause a computer to execute the above method for controlling running of a timer.

An embodiment of the present application provides a computer program, which, when running on a computer, causes the computer to execute the above-mentioned timer running method.

The embodiments of the present application provide a computer program, which, when running on a computer, causes the computer to execute the above-mentioned method for controlling running of a timer.

The embodiments of the present application perform corresponding operations on the first timer according to the received first message, so that the UE can determine the timer mechanism for uplink small data transmission and the maintained timing advance during the process of executing the CG-SDT.

DETAILED DESCRIPTION

The technical solutions in the embodiments of the present application will be described below with reference to the accompanying drawings in the embodiments of the present application.

It should be noted that the terms "first" and "second" in the description and claims of the embodiments of the present application and the above drawings are used to distinguish similar objects, and are not necessarily used to describe a specific order or sequence order. The objects described by "first" and "second" at the same time may be the same or different.

The technical solutions of the embodiments of the present application can be applied to various communication systems, for example: a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an Advanced Long Term Evolution (LTE-A) system, a New Radio (NR) system, an evolution system of NR system, an LTE-based access to unlicensed spectrum (LTE-U) system, an NR-based access to unlicensed spectrum (NR-U) system, a Universal Mobile Telecommunication System (UMTS), Wireless Local Area Networks (WLAN), Wireless Fidelity (WiFi), a 5th-Generation (5G) system or other communication systems, etc.

Generally speaking, traditional communication systems support a limited number of connections, which are easy to be implemented. However, with the development of communication technology, mobile communication systems will not only support traditional communication, but also support, for example, Device to Device (D2D) communication, Machine to Machine (M2M) communication, Machine Type Communication (MTC), and Vehicle to Vehicle (V2V) communication, etc., and the embodiments of the present application can also be applied to these communication systems.

Optionally, the communication system in the embodiments of the present application may be applied to a Carrier Aggregation (CA) scenario, a Dual Connectivity (DC) scenario, or a Standalone (SA) network distribution scenario.

The embodiments of the present application do not limit the applied spectrum. For example, the embodiments of the present application may be applied to the licensed spectrum, and may also be applied to the unlicensed spectrum.

The embodiments of the present application describe various embodiments in conjunction with the network device and the terminal device, where: the terminal device may also be referred to as User Equipment (UE), an access terminal, a subscriber unit, a subscriber station, a mobile station, a mobile, a remote station, a remote terminal, a mobile device, a user terminal, a terminal, a wireless communication device, a user agent or a user apparatus, etc. The terminal device may be a station (STAION, ST) in the WLAN, may be a cellular phone, a cordless phone, a Session Initiation Protocol (SIP) phone, a Wireless Local Loop (WLL) station, a Personal Digital Assistant (PDA) device, a handheld device with wireless communication capability, a computing device or other processing devices connected to wireless modems, an in-vehicle device, a wearable device, and a next-generation communication system, such as a terminal device in NR networks or a terminal device in the future evolved Public Land Mobile Network (PLMN) network, etc.

As an example but not a limitation, in the embodiments of the present application, the terminal device may also be a wearable device. The wearable device may also be referred to as a wearable smart device, which is a general term for wearable devices which are intelligently designed and developed for daily wear by applying wearable technology, such as glasses, gloves, watches, clothing and shoes. The wearable device is a portable device that is worn directly on the body, or integrated into the user's clothing or accessories. The wearable device is not only a hardware device, but also achieves powerful functions through software support, data interaction, and cloud interaction. Generalized wearable smart devices include full-featured and large-sized devices that can achieve complete or partial functions without relying on smartphones, such as smart watches or smart glasses, and devices that focus only on a certain type of application function and need to be used in conjunction with other devices (e.g., smartphones), such as various types of smart bracelets and smart jewelry for physical sign monitoring.

The network device may be a device used to communicate with a mobile device. The network device may be an Access Point (AP) in WLAN, a base station (Base Transceiver Station, BTS) in GSM or CDMA, or a base station (NodeB, NB) in WCDMA, it may also be an evolutional base station (Evolutional Node B, eNB or eNodeB) in LTE, or a relay station or access point, or a vehicle-mounted device, a wearable device, and a network device (gNB) in NR networks or a network device in the future evolved PLMN network.

In the embodiments of the present application, the network device provides services for a cell, and the terminal device communicates with the network device through a transmission resource (for example, a frequency domain resource, or a spectrum resource) used by the cell. The cell may be a cell corresponding to the network device (for example, a base station). The cell may belong to the macro base station, or it may belong to the base station corresponding to the small cell (Small cell), where the small cell may include: a Metro cell, a Micro cell, a Pico cell, a Femto cell, etc. These small cells have the characteristics of small coverage and low transmit power, and are suitable for providing high-speed data transmission services.

Figure 1:
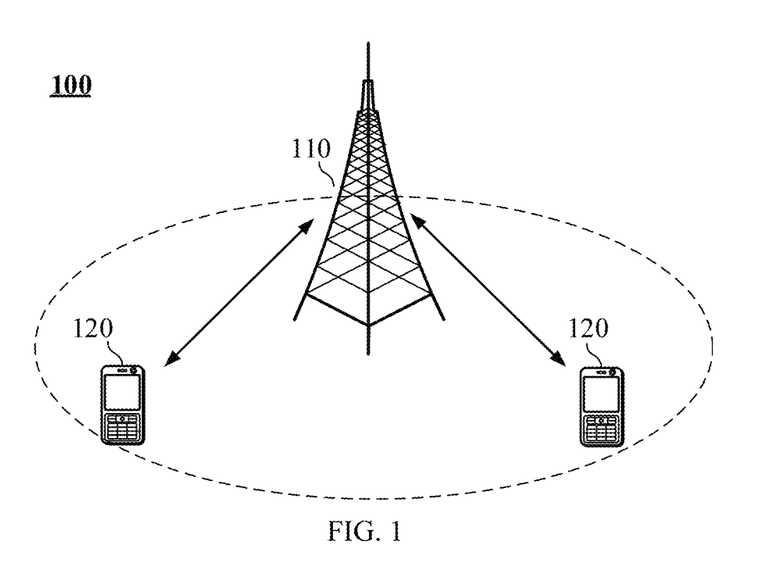
FIG. 1 is a schematic diagram of an application scenario of an embodiment of the present application.

FIG. 1 exemplarily shows one network device 110 and two terminal devices 120. Optionally, the wireless communication system 100 may include a plurality of network devices 110, and the coverage of each network device 110 may include other numbers of the terminal device 120, which is not limited in the embodiments of the present application. The embodiments of the present application may be applied to one terminal device 120 and one network device 110, and may also be applied to one terminal device 120 and another terminal device 120.

Optionally, the wireless communication system 100 may further include other network entities such as a Mobility Management Entity (MME), an Access and Mobility Management Function (AMF), which is not limited by the embodiments of the present application.

It should be understood that the terms "system" and "network" are often used interchangeably herein. The term "and/or" in the present disclosure is only an association relationship to describe the associated objects, indicating that there may be three kinds of relationships, for example, A and/or B may mean three cases: A exists alone, A and B exist at the same time, and B exists alone. In addition, the character "/" in the present disclosure generally indicates that the related objects have an "or" relationship.

It should be understood that the "indication" mentioned in the embodiments of the present application may be a direct indication, an indirect indication, or an associated relationship. For example, if A indicates B, it may mean that A directly indicates B, for example, B can be obtained through A; it may also mean that A indicates B indirectly, for example, A indicates C, and B can be obtained through C; it may also mean that there is an association relationship between A and B.

In the description of the embodiments of the present application, the term "corresponding" may indicate that there is a direct or indirect corresponding relationship between the two, or may indicate that there is an association relationship between the two, or may be a relationship of indicating and being indicated, configuring and being configured, etc.

This solution proposes a running mechanism of a timer of uplink small data transmission (SDT) and a method for maintaining a valid timing advance during the running of the timer, so that the UE can determine the timer mechanism for uplink small data transmission and the maintained timing advance during performing the uplink small data transmission based on a configured grant resource (CG-SDT).

Figure 2:
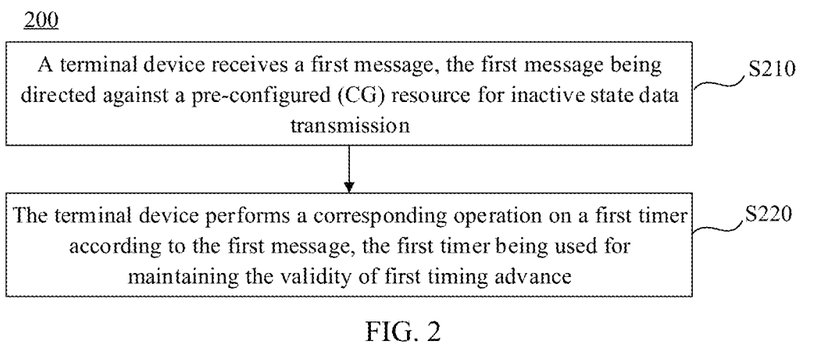
FIG. 2 is an implementation flowchart of a timer running method 200 according to an embodiment of the present application.

An embodiment of the present application proposes a timer running method. FIG. 2 is a schematic flowchart of a timer running method 200 according to an embodiment of the present application. The method can optionally be applied to the system shown in FIG. 1, but not limited thereto. The method includes at least some of the following contents.

In S210: the terminal device receives a first message, where the first message is for a configured grant (CG) resource used for inactive state data transmission.

In S220: the terminal device performs a corresponding operation on a first timer according to the first message, where the first timer is used for maintaining a validity of a first timing advance.

Optionally, the above-mentioned first timer may be a time alignment timer for uplink small data transmission (SDT-TAT). In the following embodiments, the above-mentioned first timer is specifically described as SDT-TAT.

Optionally, the above-mentioned first message includes an RRC release message. The UE receives the first message (such as the RRC release message) sent by the network device for the CG resource used for inactive state data transmission, and may perform a corresponding operation on the first timer according to different types of first messages, thereby determining the timer mechanism and the timing advance maintained.

In some implementation manners, the first timing advance may be included in the CG resource configuration/reconfiguration and configured to the UE by the network side; or, the first timing advance maintained during SDT-TAT operation may be determined by the UE. For the case where the network side configures the first timing advance to the UE through the CG resource configuration/reconfiguration, the first timing advance may remain unchanged during the operation of SDT-TAT, or be dynamically updated during the operation of SDT-TAT. The above situation will be described in detail below by taking specific embodiments.

First Embodiment

In this embodiment, the first timing advance is included in the CG resource configuration/reconfiguration, and is not dynamically updated during the operation of the SDT-TAT. This embodiment includes the following steps.

1. The UE receives the first message sent by the network side, where the first message may be an RRCRelease message. Optionally, the UE is in the RRC_CONNECTED state or the RRC_INACTIVE state when receiving the first message.

(1) If the first message is used for configuring/reconfiguring the CG resource used for inactive state data transmission, and the first message contains the configuration of SDT-TAT, the UE starts/restarts SDT-TAT, and applies the first timing advance.

Optionally, the configuration of the SDT-TAT includes at least a duration of the SDT-TAT and the first timing advance, and the UE starts/restarts the SDT-TAT, and stores/replaces the CG resource and configuration.

Specifically, the SDT-TAT may be maintained by the MAC layer of the UE. After receiving the configuration of the RRC layer, the MAC layer starts/restarts the SDT-TAT and applies the duration of the SDT-TAT and the first timing advance. The first timing advance is used for uplink data transmission in the CG-SDT process.

(2) If the first message is used for instructing the UE to keep the currently stored CG resource and configuration, the UE keeps the SDT-TAT running or restarts the SDT-TAT when the SDT-TAT is in the running state.

2. During the operation of the SDT-TAT, the UE maintains the first timing advance unchanged.

3. During the operation of the SDT-TAT, in the case of at least one of the following scenarios, the UE stops the SDT-TAT and releases the CG resource and configuration:
  a) the UE receives a CG resource release message from the network side;
  b) the UE receives a reconfiguration message from the network side, and the reconfiguration message does not contain the configuration of SDT-TAT;
  c) the UE moves to or accesses to other cell(s);
  d) the UE initiates RA-SDT;
  e) the UE enters the RRC_CONNECTED state; for example, the UE enters the RRC_CONNECTED state from the RRC_INACTIVE state.

4. When the SDT-TAT expires, the UE releases the currently stored CG resource and configuration.

In the above embodiment, when the UE receives the CG resource configuration/reconfiguration/maintaining message sent by the network side, it starts/restarts the SDT-TAT. The first timing advance of the SDT-TAT is included in the CG resource configuration/reconfiguration; during the operation of the SDT-TAT, the first timing advance of the SDT-TAT is not dynamically updated.

Second Embodiment

In this embodiment, the first timing advance is included in the CG resource configuration/reconfiguration, and during the operation of the SDT-TAT, according to a time advance command field in a medium access control control element (Timing Advance Command Medium Access Control Control Element, TAC MAC CE) or timing adjustment information indicated by the PDCCH, the first timing advance of the SDT-TAT is dynamically updated. This embodiment includes the following steps.

1. The UE receives the first message sent by the network side, where the first message may be an RRCRelease message. Optionally, the UE is in the RRC_CONNECTED state or the RRC_INACTIVE state when receiving the first message.

(1) If the first message is used for configuring/reconfiguring the CG resource for inactive state data transmission, and the first message contains the configuration of SDT-TAT, the UE starts/restarts SDT-TAT, and applies the first timing advance.

Optionally, the configuration of the SDT-TAT includes at least the duration of the SDT-TAT and the first timing advance, then the UE starts/restarts the SDT-TAT, and stores/replaces the CG resource and configuration.

Specifically, the SDT-TAT may be maintained by the MAC layer of the UE. After receiving the configuration of the RRC layer, the MAC layer starts/restarts the SDT-TAT and applies the duration of SDT-TAT and the first timing advance. The first timing advance is used for uplink data transmission in the CG-SDT process.

(2) If the first message is used for instructing the UE to keep the currently stored CG resource and configuration, the UE keeps the SDT-TAT running or restarts the SDT-TAT when the SDT-TAT is in the running state.

2. During the running of SDT-TAT, when the UE receives a TAC MAC CE sent by the Physical Downlink Shared CHannel (PDSCH) or the timing adjustment indicated by the Physical Downlink Control CHannel (PDCCH), the UE updates the first timing advance according to the TAC MAC CE or the timing adjustment amount carried in the timing adjustment, and restarts the SDT-TAT.

Steps 3 and 4 are the same as steps 3 and 4 in the first embodiment, and are not repeated here.

In the above embodiment, when the UE receives the CG resource configuration/reconfiguration/maintaining message sent by the network side, or receives the TAC MAC CE or the timing adjustment indicated by PDCCH, it starts/restarts the SDT-TAT. The first timing advance of the SDT-TAT is included in the CG resource configuration/reconfiguration; during the running of the SDT-TAT, the UE dynamically updates the first timing advance according to the TAC MAC CE or the timing adjustment amount indicated by the PDCCH.

Third Embodiment

In this embodiment, the UE determines the first timing advance maintained during the running of the SDT-TAT.

1. The UE receives the first message sent by the network side, where the first message may be an RRCRelease message. Optionally, the UE is in the RRC_CONNECTED state or the RRC_INACTIVE state when receiving the first message.

(1) If the first message is used for configuring/reconfiguring the CG resource used for inactive state data transmission, and the first message includes the configuration of the SDT-TAT, the UE starts/restarts the SDT-TAT.

Optionally, the configuration of the SDT-TAT includes at least the duration of the SDT-TAT, then the UE starts/restarts the SDT-TAT, and stores/replaces the CG resource and configuration.

Further, when the UE starts/restarts the SDT-TAT, the first timing advance may be determined; and the manner of determining the first timing advance may include:
  in the case that the second timer is in the running state, the UE using the timing advance maintained by the second timer as the first timing advance maintained during the running of the first timer;
  in the case that the second timer is not in the running state, the UE adopting the first timing advance currently maintained by the first timer;
  where the above-mentioned second timer is used for maintaining the validity of the connected state timing advance.

Specifically, the SDT-TAT may be maintained by the MAC layer of the UE. After receiving the configuration of the RRC layer, the MAC layer starts/restarts the SDT-TAT and applies the duration of SDT-TAT and the first timing advance. The first timing advance is used for uplink data transmission in the CG-SDT process.

(2) If the first message is used for instructing the UE to maintain the currently stored CG resource and configuration, the UE keeps the SDT-TAT running or restarts the SDT-TAT when the SDT-TAT is in the running state.

Further, when the UE restarts the SDT-TAT or keeps the SDT-TAT running continuously, the UE may determine the first timing advance; and the manner of determining the first timing advance is the same as the above case (1).

2. During the running of SDT-TAT, when the UE receives the TAC MAC CE sent by the PDSCH or the timing adjustment indicated by PDCCH, the UE updates the first timing advance according to the TAC MAC CE or the timing adjustment amount carried in the timing adjustment, and restarts the SDT-TAT.

Steps 3 and 4 are the same as steps 3 and 4 in the first embodiment, and are not repeated here.

In the above embodiment, when the UE receives the CG resource configuration/reconfiguration/maintaining message sent by the network side, or receives the TAC MAC CE or the timing adjustment indicated by PDCCH, it starts/restarts the SDT-TAT. The UE determines the first timing advance of the SDT-TAT by itself; during the running of the SDT-TAT, the UE dynamically updates the first timing advance according to the TAC MAC CE or the timing adjustment indicated by the PDCCH.

Combining the above embodiments, the running mechanism of the timer of the SDT proposed by the embodiments of the present application and the method for maintaining the valid timing advance during running of the timer include the followings.

(1) SDT-TAT start/restart timing may include:
the UE receiving the CG resource configuration/reconfiguration/maintaining message sent by the network side; and/or,
the UE receiving the TAC MAC CE or the timing adjustment amount indicated by the PDCCH.

(2) SDT-TAT stop timing includes:
the UE receiving a CG resource release message from the network side; and/or,
the UE receiving a reconfiguration message from the network side, and the reconfiguration message does not contain the configuration of the SDT-TAT; and/or,
the UE moving to or accessing other cell(s); and/or,
the UE initiating RA-SDT;
the UE entering the RRC_CONNECTED state.

(3) During the running of the SDT-TAT, the method for the UE to determine the first timing advance includes:
first manner: the first timing advance is included in the CG resource configuration/reconfiguration message;
second manner: the UE uses the timing advance maintained by the second timer as the first timing advance, where the second timer is used for maintaining the validity of the connected state timing advance.

According to the solutions provided by the embodiments of the present application, in the process of executing the CG-SDT, the UE can determine the running mechanism of the SDT-TAT and the maintained timing advance.

Figure 3:
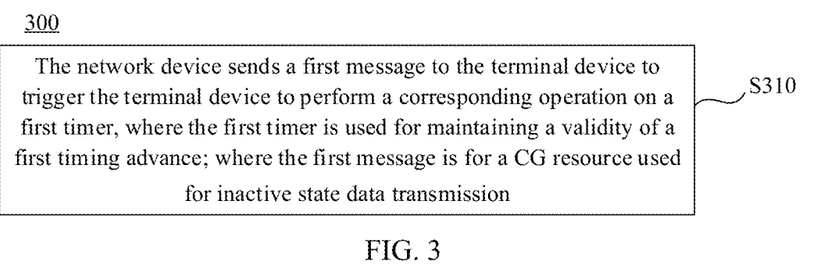
FIG. 3 is an implementation flowchart of a method 300 for controlling running of a timer according to an embodiment of the present application.

An embodiment of the present application further proposes a method for controlling running of a timer. FIG. 3 is a schematic flowchart of a method 300 for controlling the running of a timer according to an embodiment of the present application. The method can optionally be applied to the system shown in FIG. 1, but is not limited to thereto. The method includes at least some of the following contents.

In S310: the network device sends a first message to the terminal device, to trigger the terminal device to perform a corresponding operation on a first timer, where the first timer is used for maintaining a validity of a first timing advance; where the first message is for a CG resource used for inactive state data transmission.

Optionally, the above-mentioned first message includes an RRC release message.

Optionally, the above-mentioned first message is used for configuring/reconfiguring the CG resource used for inactive state data transmission, and when the first message includes a configuration of the first timer, the first message is used for triggering the terminal device to start or restart the first timer and apply the first timing advance.

Optionally, the configuration of the first timer includes a duration of the first timer and a first timing advance, and the first timing advance is used for uplink data transmission in the CG-SDT process.

Optionally, when the above-mentioned first message is used for instructing the terminal device to save the currently stored CG resource and configuration, the first message is used for triggering the terminal device to perform the following operations:
in a case that the first timer is in the running state, keeping the first timer running, or restarting the first timer.

Optionally, the configuration of the first timer includes a duration of the first timer.

Optionally, the above method further includes: the network device sending a TAC MAC CE in the PDSCH or timing adjustment information in the PDCCH to the terminal device, where the TAC MAC CE or the timing adjustment information carries a timing adjustment amount for triggering the terminal device to update the first timing advance while the first timer is running, and restart the first timer.

Optionally, the above method further includes: the network device sending a CG resource release message or a reconfiguration message that does not include the configuration of the first timer to the terminal device, to trigger the terminal device to stop the first timer and release the CG resource and configuration.

Optionally, the above-mentioned network device sending the first message to the terminal device includes: the network device sending the first message to the terminal device in the RRC connected state or the RRC inactive state.

Figure 4:
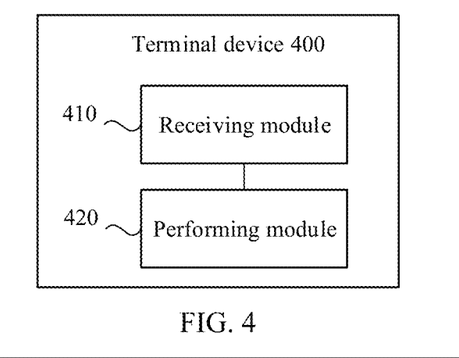
FIG. 4 is a schematic structural diagram of a terminal device 400 according to an embodiment of the present application.

An embodiment of the present application further proposes a terminal device. FIG. 4 is a schematic structural diagram of a terminal device 400 according to an embodiment of the present application, including:
a receiving module 410, configured to receive a first message, where the first message is directed to a CG resource used for inactive state data transmission;
a performing module 420, configured to perform a corresponding operation on the first timer according to the first message, where the first timer is used for maintaining a validity of the first timing advance.

Optionally, the first message includes a radio resource control (RRC) release message.

Optionally, the first message is used for configuring/reconfiguring a CG resource used for inactive state data transmission, and the first message includes a configuration of the first timer.

The performing module 420 is configured to start or restart the first timer according to the first message, and apply the first timing advance.

Figure 5:
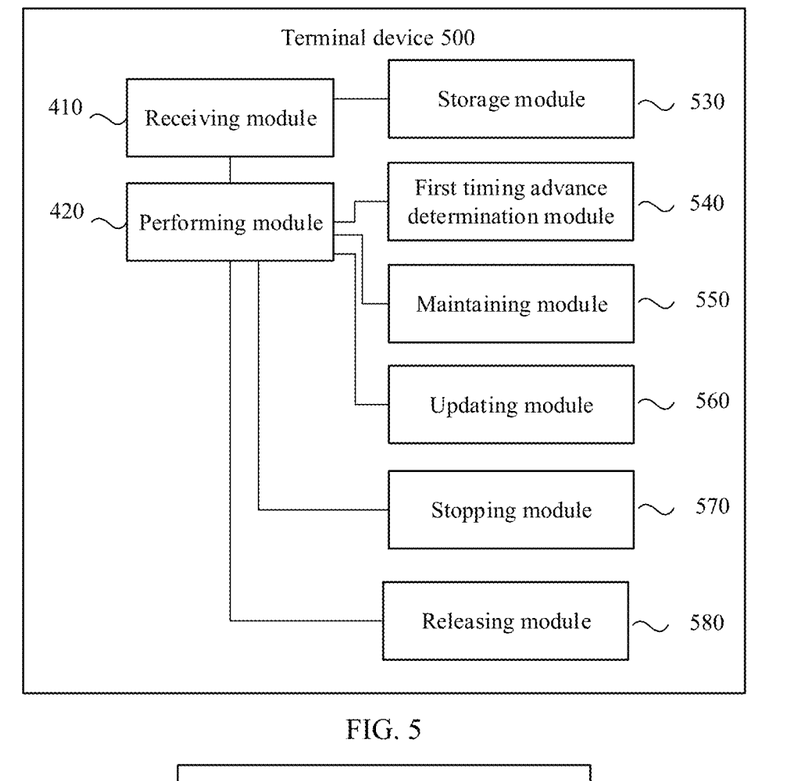
FIG. 5 is a schematic structural diagram of a terminal device 500 according to another embodiment of the present application.

An embodiment of the present application further proposes another terminal device, and FIG. 5 is a schematic structural diagram of another terminal device 500 according to an embodiment of the present application. Optionally, as shown in FIG. 5, the terminal device further includes: a storage module 530 configured to store or replace a CG resource and configuration.

Optionally, the configuration of the first timer includes a duration of the first timer and a first timing advance, and the first timing advance is used for uplink data transmission in process of uplink small data transmission based on configured grant resource (CG-SDT).

Optionally, the first message is used for instructing the terminal device to keep the currently stored CG resource and configuration.

The performing module 420 is configured to, according to the first message, keep the first timer running continuously or restart the first timer when the first timer is in a running state.

Optionally, the configuration of the first timer includes a duration of the first timer.

Optionally, the above-mentioned terminal device further includes:

a first timing advance determination module 540, configured to, in the case that the second timer is in a running state, use the timing advance maintained by a second timer as the first timing advance maintained during the running of the first timer; in the case that the second timer is not in the running state, adopt the first timing advance currently maintained by the first timer; where the second timer is used for maintaining a validity of the connected state timing advance.

Optionally, the above-mentioned terminal device further includes:

a maintaining module 550, configured to maintain the first timing advance during the running of the first timer.

Optionally, the above-mentioned terminal device further includes:

an updating module 560, configured to, during running of the first timer, in a case that the terminal device receives a time advance command field in a medium access control control element (TAC MAC CE) sent by a physical downlink shared channel (PDSCH) or timing adjustment information indicated by a downlink control channel (PDCCH), update the first timing advance according to a timing adjustment amount carried in the TAC MAC CE or the timing adjustment information and restart the first timer.

Optionally, the above-mentioned terminal device further includes:

a stopping module 570, configured to stop the first timer and release a CG resource and configuration in a case that at least one of the following scenarios occurs:

the terminal device receives a CG resource release message from a network side;

the terminal device receives a reconfiguration message from the network side, and the reconfiguration message does not contain the configuration of the first timer;

the terminal device moves to or accesses other cell(s);

the terminal device initiates an uplink small data transmission based on the random access procedure (RA-SDT);

the terminal device enters an RRC connected state.

Optionally, the above-mentioned terminal device further includes:

a releasing module 580, configured to release a currently stored CG resource and configuration in a case that the first timer expires.

Optionally, the receiving module 410 receives the first message when the terminal device is in the RRC connected state or the RRC inactive state.

It should be understood that the above and other operations and/or functions of the modules in the terminal device 400 and the terminal device 500 according to the embodiments of the present application are respectively to implement the corresponding process of the terminal device in the method 200 in FIG. 2, which are not elaborated here for brevity.

Figure 6:
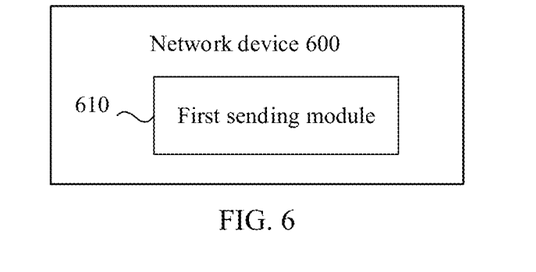
FIG. 6 is a schematic structural diagram of a network device 600 according to an embodiment of the present application.

An embodiment of the present application further proposes a network device. FIG. 6 is a schematic structural diagram of a network device 600 according to an embodiment of the present application, including:

a first sending module 610, configured to send a first message to the terminal device, to trigger the terminal device to perform a corresponding operation on the first timer, and the first timer is used for maintaining the validity of the first timing advance; the message is for a CG resource used for inactive state data transmission.

Optionally, the first message includes an RRC release message.

Optionally, the first message is used for configuring/reconfiguring a CG resource used for inactive state data transmission, and when the first message includes the configuration of the first timer, the first message is used for triggering the terminal device to start or restart the first timer and apply the first timing advance.

Optionally, the configuration of the first timer includes the duration of the first timer and the first timing advance, and the first timing advance is used for uplink data transmission in the CG-SDT process.

Optionally, when the first message is used for instructing the terminal device to save the currently stored CG resource and configuration, the first message is used for triggering the terminal device to perform the following operations:

in the case that the first timer is in the running state, keeping the first timer running, or restarting the first timer.

Optionally, the configuration of the first timer includes the duration of the first timer.

Figure 7:
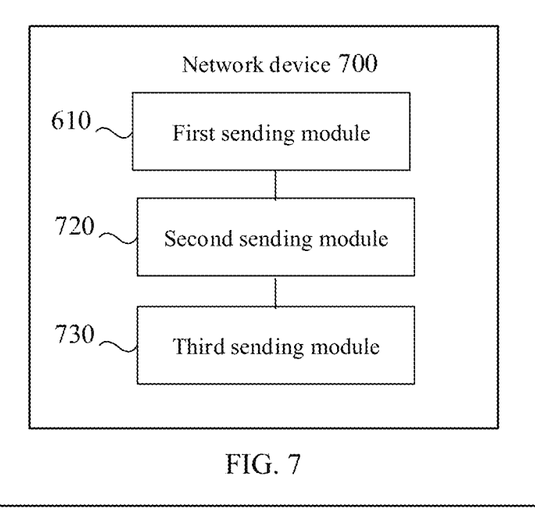
FIG. 7 is a schematic structural diagram of a network device 700 according to another embodiment of the present application.

An embodiment of the present application further proposes a network device, and FIG. 7 is a schematic structural diagram of another network device 700 according to an embodiment of the present application. Optionally, as shown in FIG. 7, the above-mentioned network device further includes:

a second sending module 720, configured to send the TAC MAC CE in the PDSCH or the timing adjustment information in the PDCCH to the terminal device, where the TAC MAC CE or the timing adjustment information carries a timing adjustment amount, to trigger the terminal device to update the first timing advance during running of the first timer, and restart the first timer.

Optionally, the above-mentioned network device further includes:

a third sending module 730, configured to send a CG resource release message or a reconfiguration message that does not include the configuration of the first timer to the terminal device, to trigger the terminal device to stop the first timer and release the CG resource and configuration.

Optionally, the first sending module 610 sends the first message to the terminal device in the RRC connected state or the RRC inactive state.

It should be understood that the above and other operations and/or functions of the modules in the network device 600 and the network device 700 according to the embodiments of the present application are respectively to implement the corresponding process of the network device in the method 300 in FIG. 3, which are not elaborated here for brevity.

It should be noted that the functions described by each module (submodule, unit, or component, etc.) in the terminal device and the network device in the embodiments of the present application may be implemented by different modules (submodules, units, or components, etc.), or may be implemented by the same module (sub-module, unit or component, etc.). For example, the first sending module and the second sending module may be different modules, or may be the same module, both of which can implement the corresponding functions in the embodiments of the present application. In addition, the sending module and the receiving module in the embodiments of the present application may be implemented by a transceiver of the device, and some or all of the other modules may be implemented by a processor of the device.

Figure 8:
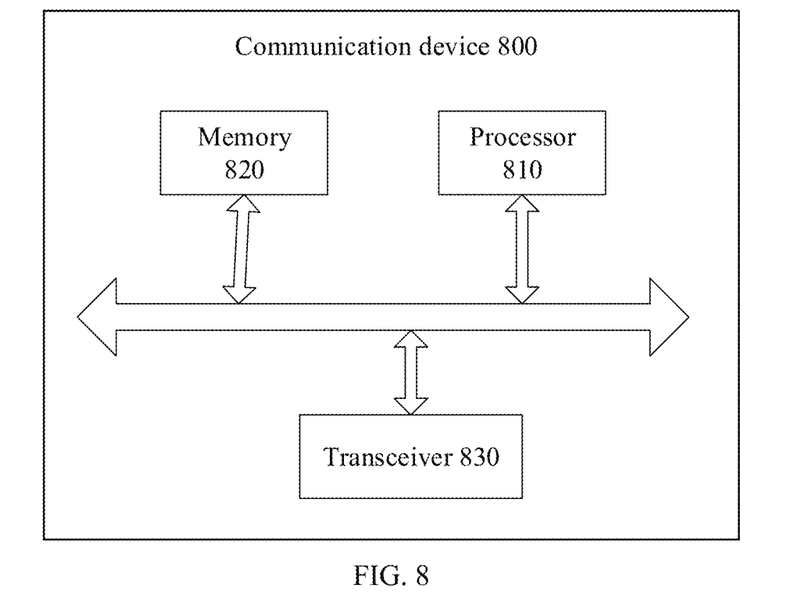
FIG. 8 is a schematic structural diagram of a communication device 800 according to an embodiment of the present application.

FIG. 8 is a schematic structural diagram of a communication device 800 according to an embodiment of the present application. The communication device 800 shown in FIG. 8 includes a processor 810, and the processor 810 can call and run a computer program from a memory, so as to implement the methods in the embodiments of the present application.

Optionally, as shown in FIG. 8, the communication device 800 may further include a memory 820. The processor 810 may call and run a computer program from the memory 820 to implement the methods in the embodiments of the present application.

The memory 820 may be a separate device independent of the processor 810, or may be integrated in the processor 810.

Optionally, as shown in FIG. 8, the communication device 800 may further include a transceiver 830, and the processor 810 may control the transceiver 830 to communicate with other devices, specifically, may send information or data to other devices, or receive information or data sent by other devices.

Among them, the transceiver 830 may include a transmitter and a receiver. The transceiver 830 may further include antennas, and the number of the antennas may be one or more.

Optionally, the communication device 800 may be a terminal device of the embodiments of the present application, and the communication device 800 may implement the corresponding processes implemented by the terminal device in each method of the embodiments of the present application, which is not repeated here for brevity.

Optionally, the communication device 800 may be a network device in the embodiments of the present application, and the communication device 800 may implement corresponding processes implemented by the network device in each method in the embodiments of the present application, which is not repeated here for brevity.

Figure 9:
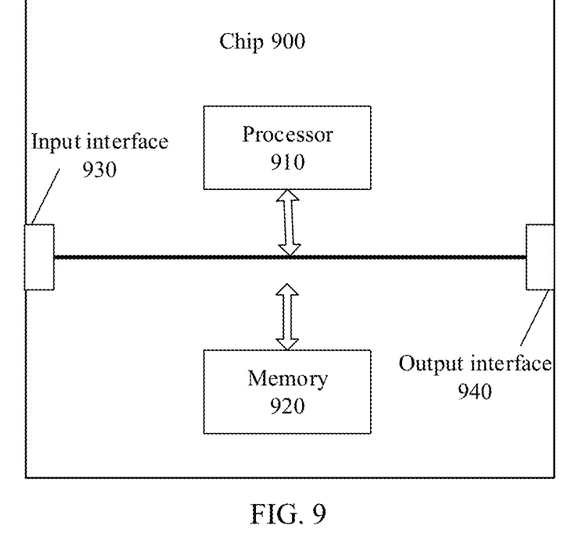
FIG. 9 is a schematic structural diagram of a chip 900 according to an embodiment of the present application.

FIG. 9 is a schematic structural diagram of a chip 900 according to an embodiment of the present application. The chip 900 shown in FIG. 9 includes a processor 910, and the processor 910 can call and run a computer program from a memory, so as to implement the methods in the embodiments of the present application.

Optionally, as shown in FIG. 9, the chip 900 may further include a memory 920. The processor 910 may call and run a computer program from the memory 920 to implement the methods in the embodiments of the present application.

The memory 920 may be a separate device independent of the processor 910, or may be integrated in the processor 910.

Optionally, the chip 900 may further include an input interface 930. The processor 910 may control the input interface 930 to communicate with other devices or chips, and specifically, may acquire information or data sent by other devices or chips.

Optionally, the chip 900 may further include an output interface 940. The processor 910 may control the output interface 940 to communicate with other devices or chips, and specifically, may output information or data to other devices or chips.

Optionally, the chip can be applied to the terminal device in the embodiments of the present application, and the chip can implement the corresponding processes implemented by the terminal device in each method of the embodiments of the present application, which is not repeated here for brevity.

Optionally, the chip can be applied to the network device in the embodiments of the present application, and the chip can implement the corresponding processes implemented by the network device in each method of the embodiments of the present application, which is not repeated here for brevity.

It should be understood that the chip mentioned in the embodiments of the present application may also be referred to as a system-level chip, a system chip, a chip system, or a system-on-chip, or the like.

The processor mentioned above may be a general-purpose processor, a digital signal processor (DSP), a field programmable gate array (FPGA), an application specific integrated circuit (ASIC) or other programmable logic devices, transistor logic devices, discrete hardware components, etc. The general-purpose processor mentioned above may be a microprocessor or any conventional processor or the like.

The memory mentioned above may be either volatile memory or non-volatile memory, or may include both volatile memory and non-volatile memory. The non-volatile memory may be a read-only memory (ROM), a programmable read-only memory (PROM), an erasable programmable read-only memory (EPROM), an electrically EPROM (EEPROM) or a flash memory. The volatile memory may be a random access memory (RAM).

It should be understood that the above memory is an example but not a limitative description, for example, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ES-DRAM), a synch link DRAM (SLDRAM) and a Direct Rambus RAM (DR RAM) and so on. That is, the memory in the embodiments of the present application is intended to include but not limited to these and any other suitable types of memory.

In the above-mentioned embodiments, it may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, all or part of the processes or functions described in the embodiments of the present application are generated. The computer may be a general purpose computer, a special purpose computer, a computer network, or other programmable apparatus. The computer instructions may be stored on a computer readable storage medium or transmitted from one computer readable storage medium to another computer readable storage medium, for example, the computer instructions may be transmitted over a wire (e.g., a coaxial cable, an optical fiber, a Digital Subscriber Line (DSL)) or wireless (e.g., infrared, wireless, microwave, etc.) means from a website site, computer, server or data center to another website site, computer, server or data center. The computer-readable storage medium can be any available medium that can be accessed by a computer or a data storage device such as a server, data center, etc. that includes one or more available media integrated. The available medium may be a magnetic medium (e.g., a floppy disk, a hard disk, a magnetic tape), an optical medium (e.g., a DVD), or a semiconductor medium (e.g., a Solid State Disk (SSD)), and the like.

It should be understood that, in various embodiments of the present application, the size of the sequence numbers of the above-mentioned processes does not mean the sequence of execution, and the execution sequence of each process should be determined by its functions and internal logic, and should not constitute any limitation on the implementation procedure of the embodiments of the present application.

Those skilled in the art can clearly understand that, for the convenience and brevity of description, the specific working process of the above-described systems, apparatuses and units may refer to the corresponding processes in the foregoing method embodiments, which will not be repeated here.

The above are only specific embodiments of the present application, but the protection scope of the present application is not limited thereto. The changes or substitutions that can be easily thought of by any person skilled in the art should be within the scope of protection of the present application. Therefore, the protection scope of the present application shall be subject to the protection scope of the claims.

What is claimed is:

1. A timer running method, the method comprising:
   receiving, by a terminal device, a first message, wherein the first message is for a Configured Grant (CG) resource used for inactive state data transmission; and
   performing, by the terminal device, a corresponding operation on a first timer according to the first message, wherein the first timer is used for maintaining a validity of a first timing advance.

2. The method according to claim 1, wherein the first message comprises a radio resource control (RRC) release message.

3. The method according to claim 1, wherein the first message is used for configuring/reconfiguring a CG resource used for inactive state data transmission, and the first message comprises a configuration of the first timer;
   wherein performing, by the terminal device, the corresponding operation on the first timer according to the first message, comprises: starting or restarting the first timer and applying the first timing advance by the terminal device.

4. The method according to claim 3, further comprising: storing or replacing the CG resource and the configuration by the terminal device.

5. The method according to claim 3, wherein the configuration of the first timer comprises a duration of the first timer and the first timing advance, and the first timing advance is used for uplink data transmission in a process of uplink small data transmission based on configured grant resource (CG-SDT).

6. The method according to claim 1, further comprising:
   during running of the first timer, in a case that the terminal device receives a time advance command field in a medium access control control element (TAC MAC CE) sent by a physical downlink shared channel (PDSCH) or timing adjustment information indicated by a downlink control channel (PDCCH), updating the first timing advance according to a timing adjustment amount carried in the TAC MAC CE or the timing adjustment information and restarting the first timer by the terminal device.

7. The method according to claim 3, wherein the configuration of the first timer comprises a duration of the first timer.

8. The method according to claim 6, further comprising:
   in a case that at least one of following scenarios occurs, stopping the first timer and releasing a CG resource and configuration by the terminal device:
   the terminal device receives a CG resource release message from a network side;
   the terminal device receives a reconfiguration message from the network side, and the reconfiguration message does not comprise a configuration of the first timer;
   the terminal device moves to or accesses other cell;
   the terminal device initiates an uplink small data transmission based on a random access procedure (RA-SDT); or
   the terminal device enters an RRC connected state.

9. A terminal device, comprising:
   a processor and a memory, wherein the memory is configured to store a computer program, which when executed by the processor, cause the terminal device to:
   receive a first message, wherein the first message is for a Configured Grant (CG) resource used for inactive state data transmission;
   perform a corresponding operation on a first timer according to the first message, wherein the first timer is used for maintaining a validity of a first timing advance.

10. The terminal device according to claim 9, wherein the terminal device is further caused to:
    maintain the first timing advance during running of the first timer.

11. The terminal device according to claim 9, wherein the terminal device is further caused to:
    during running of the first timer, in a case that the terminal device receives a time advance command field in a medium access control control element (TAC MAC CE) sent by a physical downlink shared channel (PDSCH) or timing adjustment information indicated by a downlink control channel (PDCCH), update the first timing advance according to a timing adjustment amount carried in the TAC MAC CE or the timing adjustment information and restart the first timer.

12. The terminal device according to claim 9, wherein the terminal device is further caused to:
    stop the first timer and release a CG resource and configuration in a case that at least one of following scenarios occurs:
    the terminal device receives a CG resource release message from a network side;
    the terminal device receives a reconfiguration message from the network side, and the reconfiguration message does not comprise a configuration of the first timer;
    the terminal device moves to or accesses other cell;
    the terminal device initiates an uplink small data transmission based on a random access procedure (RA-SDT);
    the terminal device enters an RRC connected state.

13. The terminal device according to claim 9, wherein the terminal device is further caused to:

release a currently stored CG resource and configuration in a case that the first timer expires.

14. The terminal device according to claim 9, wherein the terminal device is further caused to receive the first message when the terminal device is in an RRC connected state or an RRC inactive state.

15. A network device, comprising:
a processor and a memory, wherein the memory is configured to store a computer program, which when executed by the processor, causes the network device to:
send a first message to a terminal device, to trigger the terminal device to perform a corresponding operation on a first timer, wherein the first timer is used for maintaining a validity of a first timing advance; wherein the first message is for a CG resource used for inactive state data transmission.

16. The network device according to claim 15, wherein the first message comprises an RRC release message.

17. The network device according to claim 15, wherein the first message is used for configuring/reconfiguring a CG resource used for inactive state data transmission, and the first message comprises a configuration of the first timer, the first message is used for triggering the terminal device to start or restart the first timer and apply the first timing advance.

18. The network device according to claim 17, wherein the configuration of the first timer comprises a duration of the first timer and the first timing advance, and the first timing advance is used for uplink data transmission in a process of CG-SDT.

19. The network device according to claim 15, wherein the network device is further caused to send a TAC MAC CE in a PDSCH or timing adjustment information in a PDCCH to the terminal device, wherein the TAC MAC CE or the timing adjustment information carries a timing adjustment amount, which is used for triggering the terminal device to update the first timing advance during running of the first timer, and restart the first timer.

20. The network device according to claim 17, wherein the configuration of the first timer comprises a duration of the first timer.

* * * * *